A. H. BASTIAN.
PORTABLE SAWING MACHINE.
APPLICATION FILED FEB. 14, 1918.

1,280,369.

Patented Oct. 1, 1918.

Inventor:
August H. Bastian
by
Atty.

UNITED STATES PATENT OFFICE.

AUGUST H. BASTIAN, OF HILLSDALE, OREGON.

PORTABLE SAWING-MACHINE.

1,280,369.     Specification of Letters Patent.     Patented Oct. 1, 1918.

Application filed February 14, 1918. Serial No. 217,257.

*To all whom it may concern:*

Be it known that I, AUGUST H. BASTIAN, a citizen of the United States, and a resident of Hillsdale, Multnomah county, State of Oregon, have invented a certain new and useful Improvement in Portable Sawing-Machines, of which the following is a specification.

My invention relates to portable sawing machines of the type employing a reciprocating cross-head to which the saw is affixed. The object of my invention is to provide a quick, but secure, way of fastening the saw to the cross-head. To this end I provide the cross-head with stud-pins and the saw with corresponding holes to receive the latter, and I further provide the cross-head with a cam-operated clamping, lever arm adapted to bear on the saw adjacent said stud-pins of the cross-head and rigidly hold it on the latter.

These details and incidental features relating to novel combinations effecting the simplicity and efficiency of my device are hereinafter described and illustrated in the accompanying drawings, in which.

$a$ and $b$ represent guide elements on which is mounted a cross-head $c$, connected by a pitman $d$ with crank-arm of the driven shaft not shown. The cross-head is provided with friction rollers $e$, $e'$, $f$, $f'$, which bear on the opposite sides of the lower guide-rod $b$; the rollers being adjustable toward and from said guide-rod. The cross-head is further provided with friction rollers $g$, $g'$, of which the rollers $g$ is understood to be adjustable toward and from the guide-rod $a$; the adjustment feature being provided in order to take care of wear, also to adapt the cross-head to be readily mounted on, and moved from, the guide-rods $a$, $b$. The cross head is provided with stud pins $h$, $i$, and the saw blade $j$ is provided with corresponding holes for such stud-pins.

Figure 1:
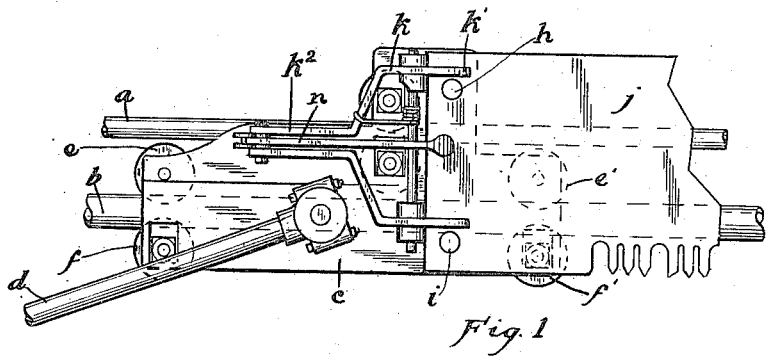
Figure 1 is a side elevation of the guide rods and the cross-head mounted thereon of a sawing machine and the pitman connecting the cross-head with the crank arm; the cross-head is provided with my said improvement for quickly and securely fastening the saw blade thereto.
Figure 2:
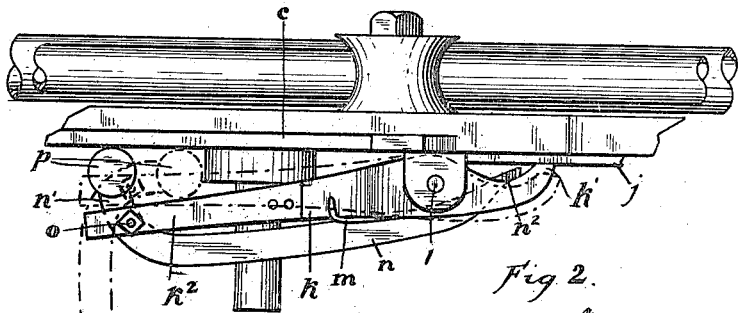
Fig. 2 is a top view of the parts shown in Fig. 1, but on a larger scale than the latter.
Figure 3:
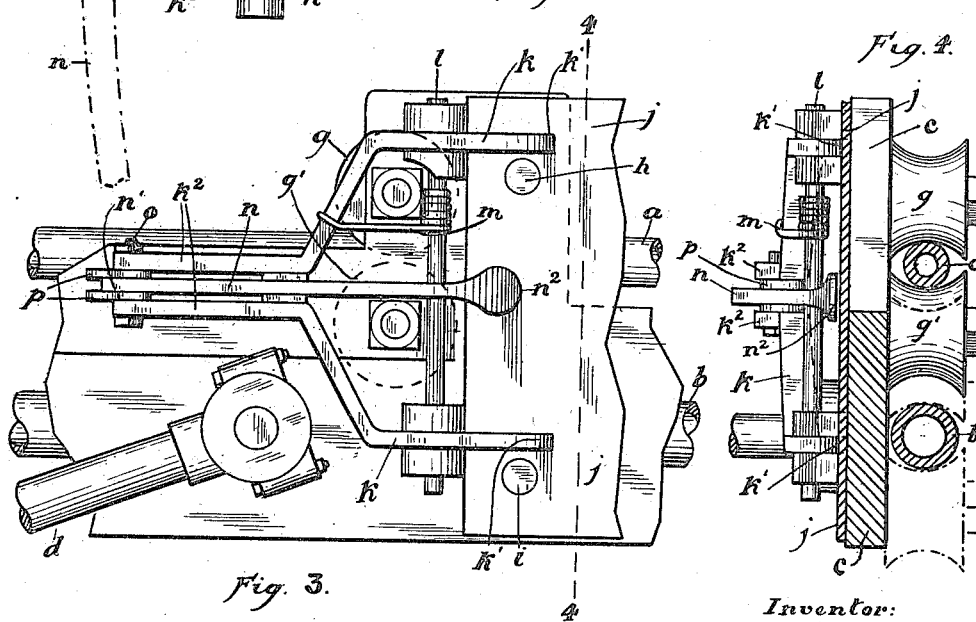
Fig. 3 is a larger-scale sectional elevation similar to Fig. 1.
Figure 4:
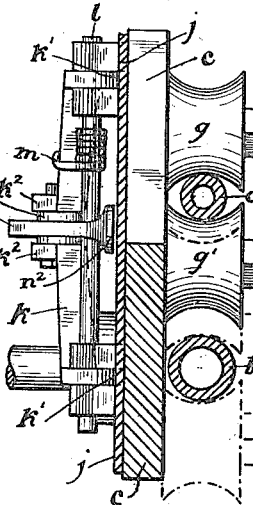
Fig. 4 is a section on line 4—4 of Fig. 3.

In order to clamp the saw firmly in place after having been mounted on said stud pins, I provide a clamping device constructed as follows; $k$ is a bifurcated clamping lever arm which is fulcrumed on a shaft $l$. A spring $m$ is adapted normally so to tilt the lever-arm $k$ as to lift its short-end $k'$ clear of the saw $j$, so that the latter may be readily placed on said stud-pins $h$, $i$, or removed therefrom. The long end $k^2$ of the lever-arm $k$ has fulcrumed in it a locking lever $n$ by a fulcrum-pin or bolt, $o$, and on the short extremity $n'$ of the locking lever $n$ is journaled a cam-roller $p$. As will be noted, the construction of the locking lever, $n$, and the arrangement of its fulcrum and roller $p$, is such as to give the same a cam effect. When the locking lever $n$ is arranged as shown in dotted outline in Fig. 2, the spring $m$ is free to tilt the lever-arm $k$ in its saw-releasing position; but when the locking lever $n$ is brought forward, as shown in full lines in Fig. 2, then the cam-roller end of the locking lever forces the long end $k^2$ of the lever-arm $k$ from the cross head, and in so doing causes the short end $k'$ of the lever-arm to bear with great force on the saw blade and hold the same rigidly in place on the stud-pins $h$, $i$. It will further be noted that when the locking arm $n$ is arranged in its active position then its extremity $n^2$, is placed below the outer surfaces of the short-ends $k'$ of the locking lever $k$, and by such arrangement is located out of the way; being arranged substantially parallel with the lever-arm $k$, as shown in Fig. 2. And, furthermore, when the locking-lever $n$ is arranged in its active or holding position the cam-roller $p$ will be located at one side of the fulcrum-pin $o$ and thus securely hold the locking-lever $n$ in its active position until it is forcibly moved from such position back into its releasing or inactive position.

I claim:

1. In a portable sawing machine, a cross-head provided with saw-holding means, a bifurcated lever fulcrumed on the cross-head having its arms located to bear on the cross-head adjacent said saw-holding means, a spring operating normally to space said arms from the cross-head, a locking lever fulcrumed on the clamping-lever having a long end projecting above the latter and a short end projecting below the same, and the short end bearing on the cross-head.

2. In a portable sawing machine, a cross-head provided with saw-holding means, a bifurcated lever fulcrumed on the cross-head having its arms located to bear on the cross-head adjacent said saw-holding means, a spring operating normally to space said arms from the cross-head, a locking lever fulcrumed on the clamping lever having a long end projecting above the latter and a short end projecting below the same, the short end bearing on the cross-head, and the long end of said locking lever being curved so that when arranged in its locking position its extremity will be located below the outer faces of the arms of said clamping lever.

3. In a portable sawing machine, a cross-head provided with saw-holding means, a bifurcated lever fulcrumed on the cross-head having its arms located to bear on the cross-head adjacent said saw-holding means, a spring operating normally to space said arms from the cross-head, a locking lever fulcrumed on the clamping lever having a long end projecting above the latter and a short end projecting below the same, said short end being curved toward the fulcrum of the clamping lever, and the short end bearing on the cross-head.

4. In a portable sawing machine, a cross-head provided with saw-holding means, a bifurcated lever fulcrumed on the cross-head having its arms located to bear on the cross-head adjacent said saw-holding means, a spring operating normally to space said arms from the cross-head, a locking lever fulcrumed on the clamping lever having a long end projecting above the latter and a short end projecting below the same, said short end being curved toward the fulcrum of the clamping lever, a roller journaled in the extremity of said short end, and said roller bearing on the cross-head.

AUGUST H. BASTIAN.

Copies of this patent may be obtained for five cents each, by addressing the "Commissioner of Patents, Washington, D. C."